(12) United States Patent
Sato

(10) Patent No.: US 11,654,727 B2
(45) Date of Patent: May 23, 2023

(54) PNEUMATIC TIRE

(71) Applicant: Toyo Tire Corporation, Itami (JP)

(72) Inventor: Yoshiki Sato, Itami (JP)

(73) Assignee: Toyo Tire Corporation, Itami (JP)

( * ) Notice: Subject to any disclaimer, the term of this patent is extended or adjusted under 35 U.S.C. 154(b) by 26 days.

(21) Appl. No.: 17/472,925

(22) Filed: Sep. 13, 2021

(65) Prior Publication Data

US 2022/0097465 A1     Mar. 31, 2022

(30) Foreign Application Priority Data

Sep. 30, 2020   (JP) .............................. JP2020-164742

(51) Int. Cl.
| | | |
|---|---|---|
| *B60C 13/02* | (2006.01) | |
| *B60C 11/01* | (2006.01) | |
| *B60C 11/03* | (2006.01) | |
| *B60C 11/12* | (2006.01) | |

(52) U.S. Cl.
CPC .............. *B60C 13/02* (2013.01); *B60C 11/01* (2013.01); *B60C 11/0306* (2013.01); *B60C 2011/0346* (2013.01); *B60C 2011/1213* (2013.01); *B60C 2011/1254* (2013.01); *B60C 2200/14* (2013.01)

(58) Field of Classification Search
CPC ........ B60C 13/001; B60C 11/01; B60C 13/02
See application file for complete search history.

(56) References Cited

U.S. PATENT DOCUMENTS

| | | | |
|---|---|---|---|
| 6,533,007 B1 * | 3/2003 | McMannis .............. | B60C 11/01 |
| | | | 152/209.16 |
| 2015/0007918 A1 | 1/2015 | Hironaka et al. | |
| 2022/0063342 A1 * | 3/2022 | Horiuchi ............. | B60C 11/0302 |

FOREIGN PATENT DOCUMENTS

WO       2013/125246 A1    8/2013

\* cited by examiner

*Primary Examiner* — Robert C Dye
*Assistant Examiner* — Nicholas J Weiler
(74) *Attorney, Agent, or Firm* — WHDA, LLP

(57) ABSTRACT

In a pneumatic tire, a plurality of side blocks include a first side block which is contiguous with the exterior in a tire axial direction of a first tread block, and a second side block which is contiguous with the exterior in the tire axial direction of a second tread block; the first side block comprises a first apical surface which is arranged at an outer end of the first side block in the tire axial direction; the second side block comprises a second apical surface which is arranged at an outer end of the second side block in the tire axial direction, and area of the second apical surface is greater than area of the first apical surface.

18 Claims, 8 Drawing Sheets

PNEUMATIC TIRE

CROSS REFERENCE TO RELATED APPLICATIONS

This application claims the benefit of priority of Japanese application no. 2020-164742, filed on Sep. 30, 2020, which is incorporated herein by reference.

BACKGROUND OF THE INVENTION

Field of the Invention

The present disclosure relates to a pneumatic tire.

Description of the Related Art

Conventionally, the tread of a pneumatic tire might, for example, comprise a plurality of tread blocks arrayed in the tire circumferential direction. Furthermore, a sidewall of a pneumatic tire might comprise a plurality of side blocks arranged toward the exterior in the tire axial direction from the tread blocks (e.g., WO2013/125246A).

At the pneumatic tire associated with WO2013/125246A, the outer ends in the tire axial direction of the tread surfaces of the respective tread blocks are at the same location, and the shapes of the respective side blocks are the same. While this may make it possible to cause rigidity of the buttress (the region at the outer end in the tire radial direction of the sidewall) to be made uniform in the tire circumferential direction, it fails to permit achievement of adequate improvement in terms of performance with respect to traction (e.g., ability of side block surfaces and/or edge components to produce traction when contact with the ground takes place at mud, sand, or rock).

SUMMARY OF THE INVENTION

It is an object of the present disclosure to provide a pneumatic tire that permits achievement of improvement in terms of performance with respect to traction, and also makes it possible to suppress occurrence of differences in the rigidity of the buttress in the tire circumferential direction.

There is provided a pneumatic tire comprises
a sidewall which extends in a tire radial direction; and
a tread which is contiguous with an outer end in the tire radial direction of the sidewall and which has a tread surface toward the exterior in the tire radial direction;
wherein the tread comprises a plurality of width grooves which extend as far as an outer end in a tire axial direction, and a plurality of tread blocks which are partitioned by the plurality of width grooves;
the plurality of tread blocks include a first tread block, and a second tread block, an outer end in the tire axial direction at the tread surface of the second tread block is arranged toward the interior in the tire axial direction from an outer end in the tire axial direction at the tread surface of the first tread block;
the sidewall comprises a plurality of side blocks which protrude therefrom in the tire axial direction;
the plurality of side blocks include a first side block which is contiguous with the exterior in the tire axial direction of the first tread block, and a second side block which is contiguous with the exterior in the tire axial direction of the second tread block;
the first side block comprises a first apical surface which is arranged at an outer end of the first side block in the tire axial direction;
the second side block comprises a second apical surface which is arranged at an outer end of the second side block in the tire axial direction; and
area of the second apical surface is greater than area of the first apical surface.

DETAILED DESCRIPTION OF THE INVENTION

Below, an embodiment of a pneumatic tire is described with reference to FIG. 1 through FIG. 8. At the respective drawings, note that dimensional ratios at the drawings and actual dimensional ratios are not necessarily consistent, and note further that dimensional ratios are not necessarily consistent from drawing to drawing.

Figure 1:
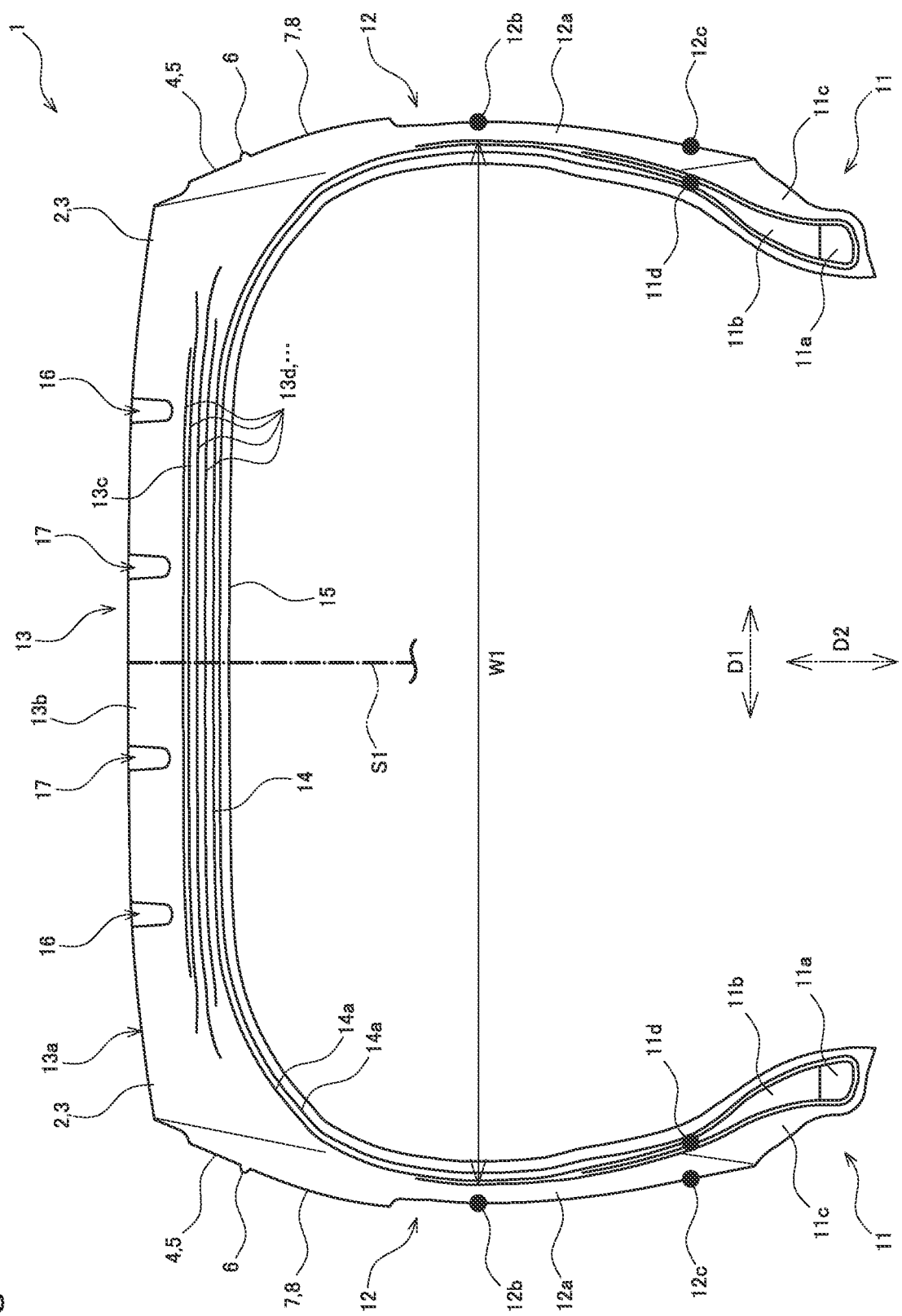
FIG. 1 is a view of a section, taken along a tire meridional plane, of the principal components in a pneumatic tire associated with an embodiment.

As shown in FIG. 1, pneumatic tire (hereinafter also referred to as simply "tire") 1 comprises a pair of bead regions 11; sidewalls 12 which extend outwardly in the tire radial direction D2 from the respective bead regions 11; and tread 13 which is contiguous with the respective outer ends in the tire radial direction D2 of the pair of sidewalls 12 and which has tread surface 13a that contacts the road surface toward the exterior in the tire radial direction D2. Note that tire 1 may be mounted on a rim (not shown).

At the respective drawings, first direction D1 is the tire axial direction D1 which is parallel to the tire rotational axis, second direction D2 is the tire radial direction D2 which is the direction of the diameter of tire 1, and third direction D3 is the tire circumferential direction D3 which is the direction that is circumferential with respect to the rotational axis of the tire. Furthermore, tire equatorial plane S1 refers to a plane that is located centrally in the tire axial direction D1 and that is perpendicular to the rotational axis of the tire; tire meridional planes S2, S3 refer to planes that are perpendicular to tire equatorial plane S1 and that contain the rotational axis of the tire.

In the tire axial direction D1, note that toward the interior means nearer to tire equatorial plane S1, and note that toward the exterior means farther away from tire equatorial plane S1. Furthermore, in the tire radial direction D2, note that toward the interior means nearer to the tire rotational axis, and toward the exterior means farther away from the tire rotational axis. Furthermore, the tire circumferential direction D3 may be further subdivided into first side D31, which is also referred to as first circumferential direction side D31; and second side D32, which is also referred to as second circumferential direction side D32.

Bead region 11 comprises bead core 11a which is formed so as to be annular in shape, and bead filler 11b which is arranged toward the exterior in the tire radial direction D2 from bead core 11a. For example, bead core 11a might be formed by laminating rubber-covered bead wires (e.g., metal wires), and bead filler lib might be formed from hard rubber that has been made to taper as one proceeds toward the exterior in the tire radial direction D2.

Furthermore, tire 1 comprises carcass 14 suspended between pair of bead cores 11a, 11a; and innerliner 15 that is arranged toward the interior from carcass 14 and that faces the interior space of tire 1 which is or will be filled with air. Carcass 14 and innerliner 15 are arranged in parallel fashion with respect to the inside circumferential surface of the tire over a portion thereof that encompasses bead regions 11, sidewalls 12, and tread 13.

Bead region 11 comprises rim strip rubber 11c which is arranged toward the exterior in the tire axial direction D1 from carcass 14 and which is intended to constitute the outer surface that will come in contact with the rim. Sidewall 12 comprises sidewall rubber 12a which is arranged toward the exterior in the tire axial direction D1 from carcass 14 and which is intended to constitute the outer surface.

Tread 13 comprises tread rubber 13b which constitutes tread surface 13a, and belt 13c which is arranged between tread rubber 13b and carcass 14. Belt 13c comprises a plurality (four at FIG. 1) belt plies 13d. Belt plies 13d might, for example, comprise a plurality of belt cords (e.g., organic fiber and/or metal) which are arrayed in parallel fashion, and topping rubber with which the belt cords are covered.

Carcass 14 is made up of at least one (two at FIG. 1) carcass ply 14a. Carcass ply 14a folds back upon itself and wraps about bead core 11a so as to envelop bead core 11a. Furthermore, carcass ply 14a comprises a plurality of ply cords (e.g., organic fiber and/or metal) which are arrayed in directions more or less perpendicular to the tire circumferential direction D3, and topping rubber with which the ply cords are covered.

Innerliner 15 has superior functionality in terms of its ability to impede passage of gas therethrough so as to permit air pressure to be maintained. The constitution at sidewall 12 may be such that, as is the case in the present embodiment, innerliner 15 is in intimate contact with the inside circumferential surface of carcass 14, there being no other member that intervenes between innerliner 15 and carcass 14.

Furthermore, distance between the inside circumferential surface of the tire (inside circumferential surface of innerliner 15) and the carcass ply 14a which is arranged nearest to the inside circumferential surface might, for example, be made to be 90% to 180% at sidewall 12 of what it is at tread 13. Furthermore, this distance might, for example, be made to be 120% to 160% at sidewall 12 of what it is at tread 13.

Provided at the outer surface of sidewalls 12 are locations 12b which are at the same locations in the tire radial direction D2 as the locations at which tire width is a maximum (more specifically, the locations at which distance W1 between respective exterior points in the tire axial direction D1 of carcass 14 is a maximum). Below, these locations 12b are referred to as tire maximum width locations 12b.

Furthermore, provided at the outer surface of sidewalls 12 are locations 12c which are at the same locations in the tire radial direction D2 as outer ends 11d in the tire radial direction D2 of bead filler lib. Below, these locations 12c are referred to as bead end locations 12c.

Figure 2:
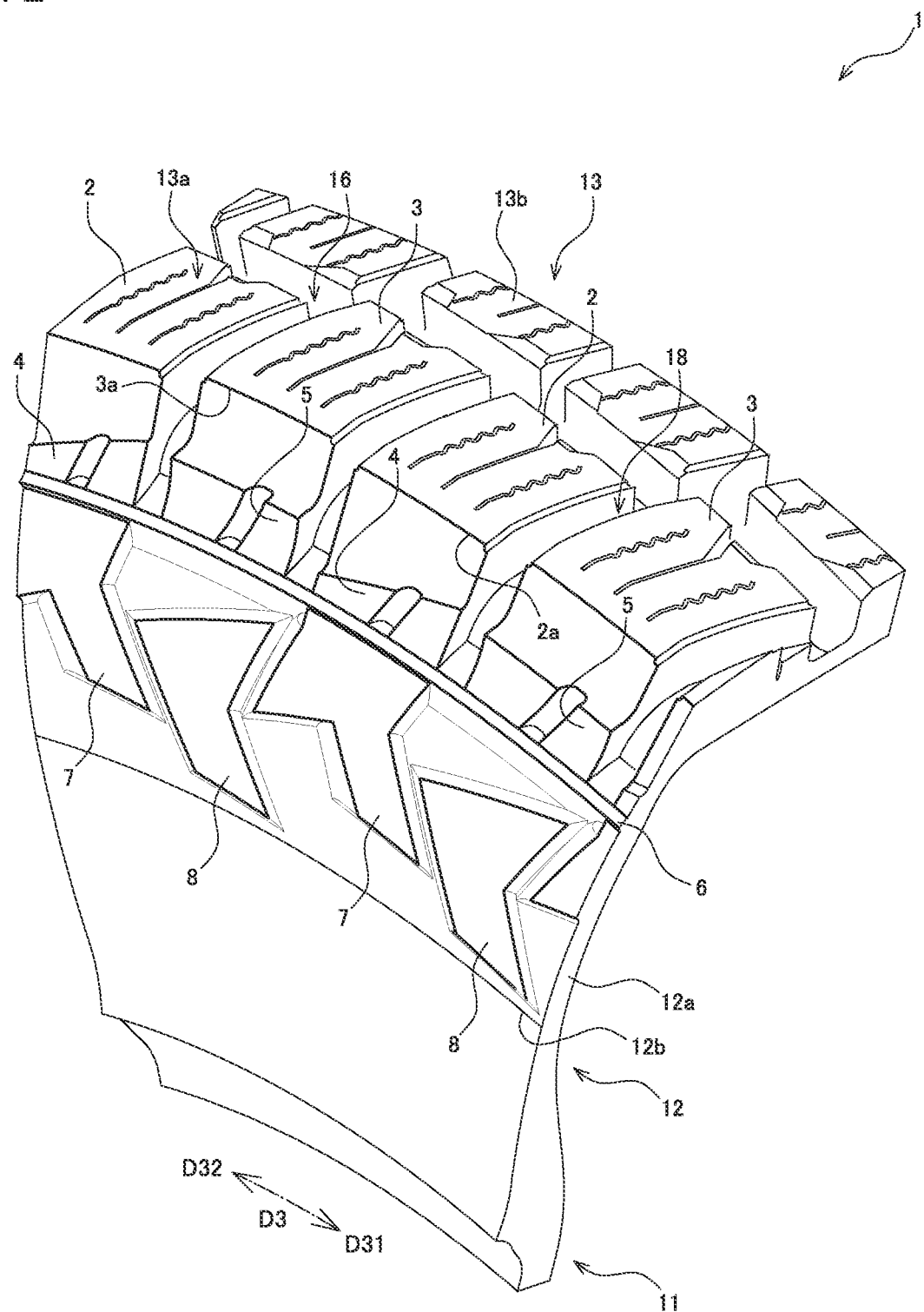
FIG. 2 is a perspective view of the principal components in a pneumatic tire associated with same embodiment.
Figure 3:
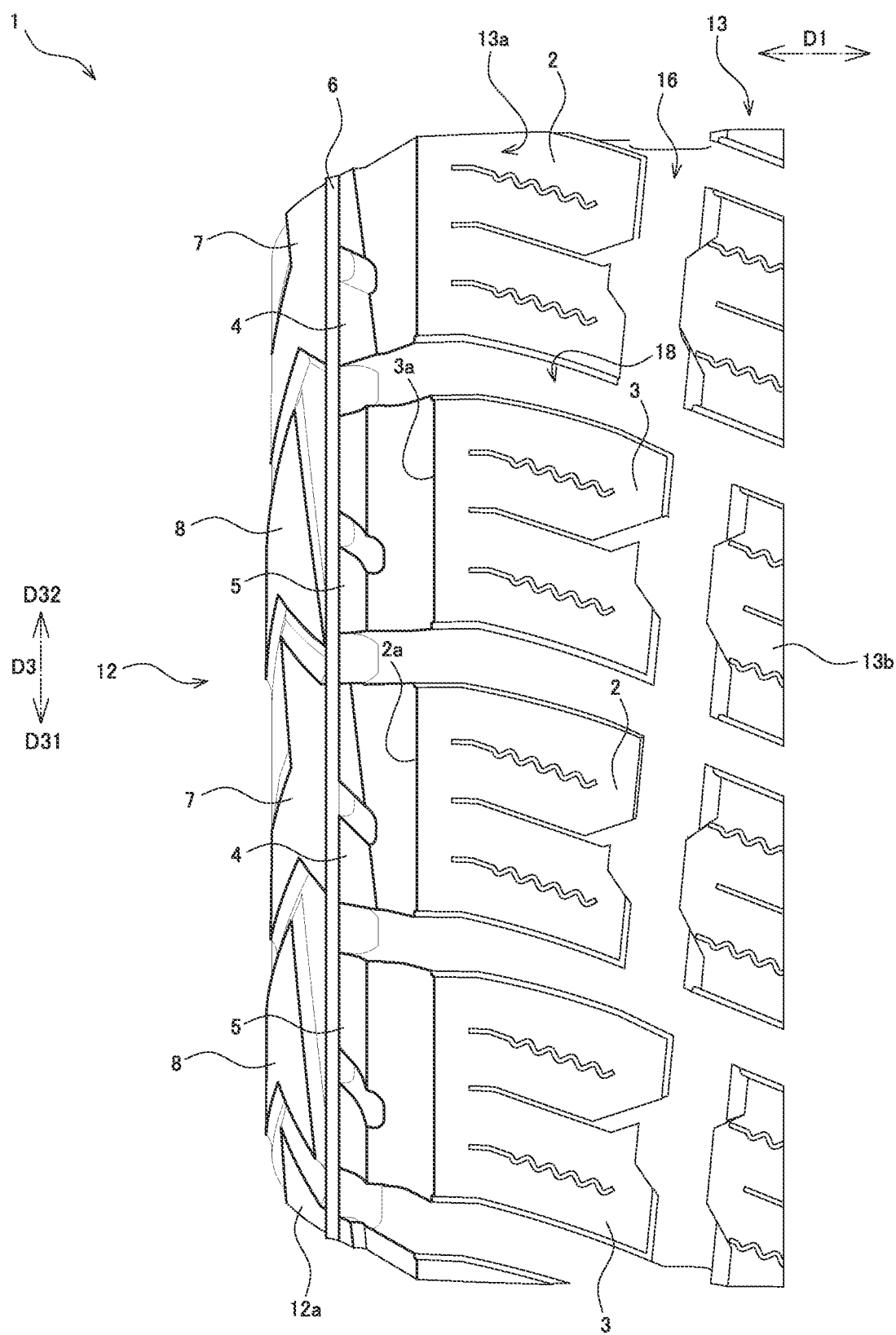
FIG. 3 is a plan view of the principal components in a pneumatic tire associated with same embodiment (drawing showing situation as seen in tire radial direction)

As shown in FIG. 1 through FIG. 3, tread rubber 13b comprises a plurality of main grooves 16, 17 that extend continuously in the tire circumferential direction D3 along the entire length in the tire circumferential direction D3 of tread surface 13a. In addition, tread rubber 13b comprises a plurality of width grooves 18 which extend as far as the outer end in the tire axial direction D1, and a plurality of tread blocks 2, 3 which are partitioned by the plurality of width grooves 18.

Main grooves 16, 17 might, for example, comprise so-called tread wear indicators (not shown) which are portions at which depth of the groove is reduced so as to make it possible to ascertain the extent to which wear has occurred as a result of the exposure thereof that takes place in accompaniment to wear. Furthermore, main grooves 16, 17 might, for example, have groove widths that are each not less than 3% of the dimension in the tire axial direction D1 of tread surface 13a. Furthermore, main grooves 16, 17 might, for example, have groove widths that are each not less than 5 mm.

The pair of main grooves 16, 16 arranged in outermost fashion in the tire axial direction D1 are referred to as shoulder main grooves 16, 16, and the main grooves 17, 17 arranged between the pair of shoulder main grooves 16, 16 are referred to as center main grooves 17, 17. Moreover, while there is no particular limitation with respect to the number of main grooves 16, 17, the number that are present in the present embodiment is four.

The plurality of tread blocks 2, 3 are partitioned by the plurality of width grooves 18 and shoulder main groove 16. Furthermore, the plurality of tread blocks 2, 3 are arranged so as to be arrayed in the tire circumferential direction D3. In addition, the plurality of tread blocks 2, 3 comprise first tread blocks 2 and second tread blocks 3, for which the locations in the tire axial direction D1 of the outer ends 2a, 3a thereof in the tire axial direction D1 at tread surface 13a are different.

Outer end 3a in the tire axial direction D1 at tread surface 13a of second tread block 3 is arranged toward the interior in the tire axial direction D1 from outer end 2a in the tire axial direction D1 at tread surface 13a of first tread block 2. Note that first tread blocks 2 and second tread blocks 3 may, as is the case in the present embodiment, be arranged in alternating fashion in the tire circumferential direction D3.

Figure 4:
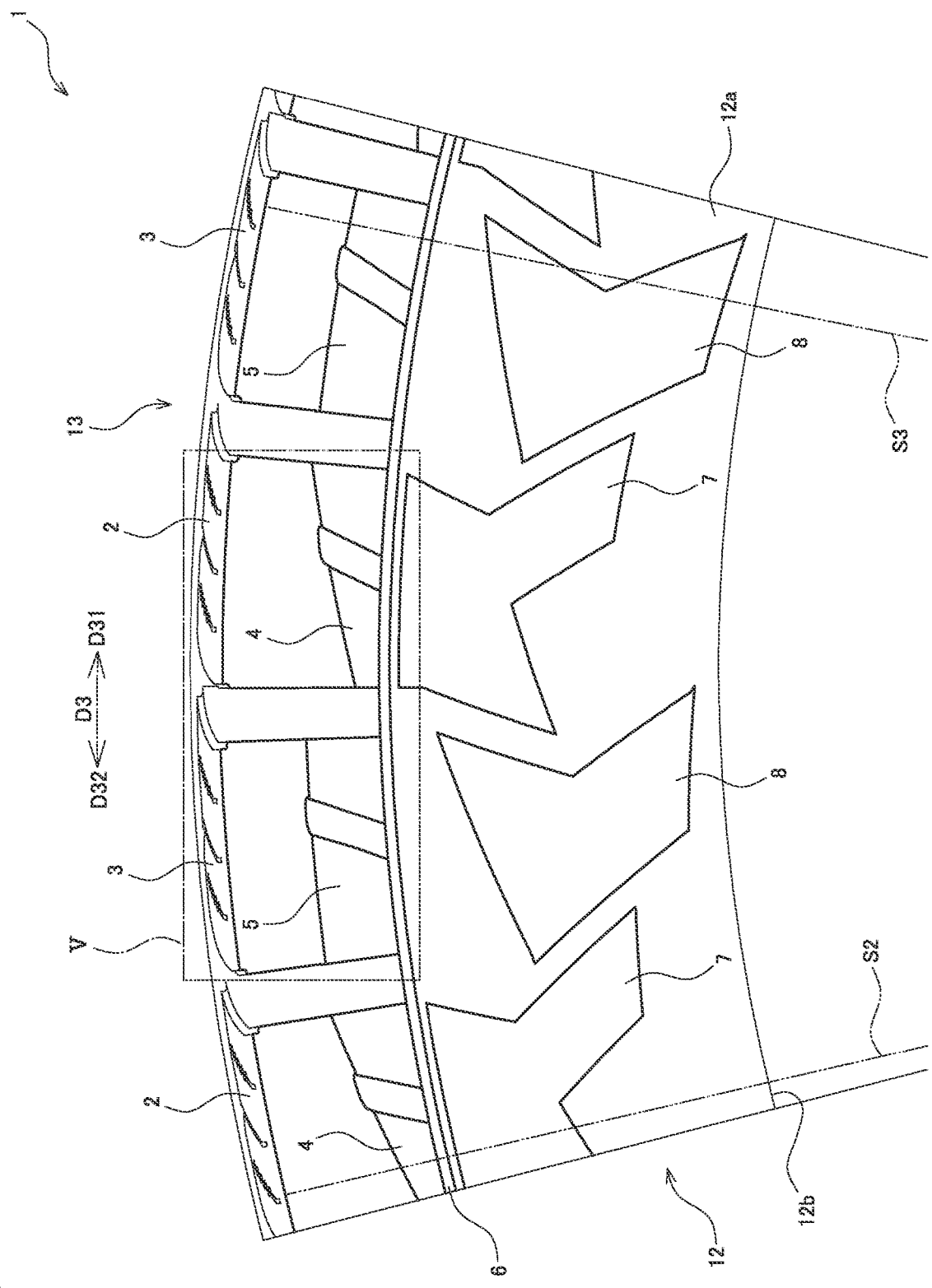
FIG. 4 is a side view of the principal components in a pneumatic tire associated with same embodiment (drawing showing situation as seen in tire axial direction)

As shown in FIG. 2 through FIG. 4, sidewall rubber 12a comprises a plurality of first and second side blocks 4, 5 which protrude therefrom in the tire axial direction D1. First side blocks 4 and second side blocks 5 may, as is the case in the present embodiment, be arranged in alternating fashion in the tire circumferential direction D3.

Sidewall rubber 12a may, as is the case in the present embodiment, be provided with annular protrusion 6, which protrudes in the tire axial direction D1 and which extends in the tire circumferential direction D3, at a location toward the interior in tire radial direction D2 from first and second side blocks 4, 5. Furthermore, sidewall rubber 12a may, as is the case in the present embodiment, be provided with a plurality of third and fourth side blocks 7, 8, which protrude in the tire axial direction D1, at a location toward the interior in tire radial direction D2 from annular protrusion 6.

Moreover, first tread block 2, first side block 4, and third side block 7 may, as is the case in the present embodiment, be arranged so as to intersect a common tire meridional plane S2 (see FIG. 4). Furthermore, second tread block 3, second side block 5, and fourth side block 8 may, as is the case in the present embodiment, be arranged so as to intersect a common tire meridional plane S3 (see FIG. 4).

Annular protrusion 6 may, as is the case in the present embodiment, extend continuously in the tire circumferential direction D3 along the entire length in the tire circumferential direction D3 of sidewall rubber 12a. Furthermore, annular protrusion 6 may, as is the case in the present embodiment, protrude to a height that is greater than that of respective side blocks 4, 5, 7, 8. Note that such a constitution will have the effect of causing steps to be formed between annular protrusion 6 and respective side blocks 4, 5, 7, 8.

Third side block 7 and fourth side block 8 may, as is the case in the present embodiment, be mutually separated in the tire circumferential direction D3 such that a gap is present therebetween. Furthermore, third side blocks 7 and fourth side blocks 8 may, as is the case in the present embodiment, be arranged in alternating fashion in the tire circumferential direction D3.

The outer end in the tire radial direction D2 of third side block 7 is located toward the exterior in the tire radial direction D2 from the outer end in the tire radial direction D2 of fourth side block 8. In addition, the inner end in the tire radial direction D2 of third side block 7 is located toward the exterior in the tire radial direction D2 from the inner end in the tire radial direction D2 of fourth side block 8. This being the case, as viewed in the tire circumferential direction D3, a portion of third side block 7 will appear to overlap a portion of fourth side block 8.

Annular protrusion 6 and respective side blocks 4, 5, 7, 8 comprise surface and edge components. In addition, at locations where contact with the ground takes place at mud, sand, or rock, formation of irregular shapes permits increase in the area over which contact with the ground occurs at mud, sand, or rock; furthermore, surfaces and edges resulting from such irregular shapes facilitate contact with the ground at mud, sand, or rock at a variety of locations. For this reason, formation of irregular shapes at locations where contact with the ground takes place at mud, sand, or rock improves performance with respect to traction.

For example, when mud or sand is subjected to shearing by annular protrusion 6 and/or respective side blocks 4, 5, 7, 8, resistance due to such shearing will cause production of traction. Furthermore, for example, when annular protrusion 6 and/or respective side blocks 4, 5, 7, 8 come in contact with rock, friction due to such contact will cause production of traction.

In addition, annular protrusion 6 and respective side blocks 4, 5, 7, 8 are arranged at locations toward the exterior in the tire radial direction D2 from bead end locations 12c (see FIG. 1). It is preferred, e.g., as is the case in the present embodiment, that annular protrusion 6 and respective side blocks 4, 5, 7, 8 be arranged at locations toward the exterior in the tire radial direction D2 from tire maximum width locations 12b.

As a result, under muddy and/or sandy conditions, when the weight of the vehicle causes tire 1 to sink such that it is buried under mud and/or sand, annular protrusion 6 and respective side blocks 4, 5, 7, 8 are able to come in contact with the ground; and under rocky conditions, annular protrusion 6 and respective side blocks 4, 5, 7, 8 are able to come in contact with irregular surfaces of rocks. That is, annular protrusion 6 and respective side blocks 4, 5, 7, 8 come in contact with the ground under bad road conditions such as when the terrain is muddy, sandy, and/or rocky.

Moreover, annular protrusion 6 and respective side blocks 4, 5, 7, 8 are arranged at locations toward the interior in the tire radial direction D2 from tread surface 13a. As a result, annular protrusion 6 and respective side blocks 4, 5, 7, 8 do not come in contact with the ground during normal travel on a flat road.

The constitution of first side block 4 and second side block 5 will now be described with reference to FIG. 5 through FIG. 8.

Figure 5:
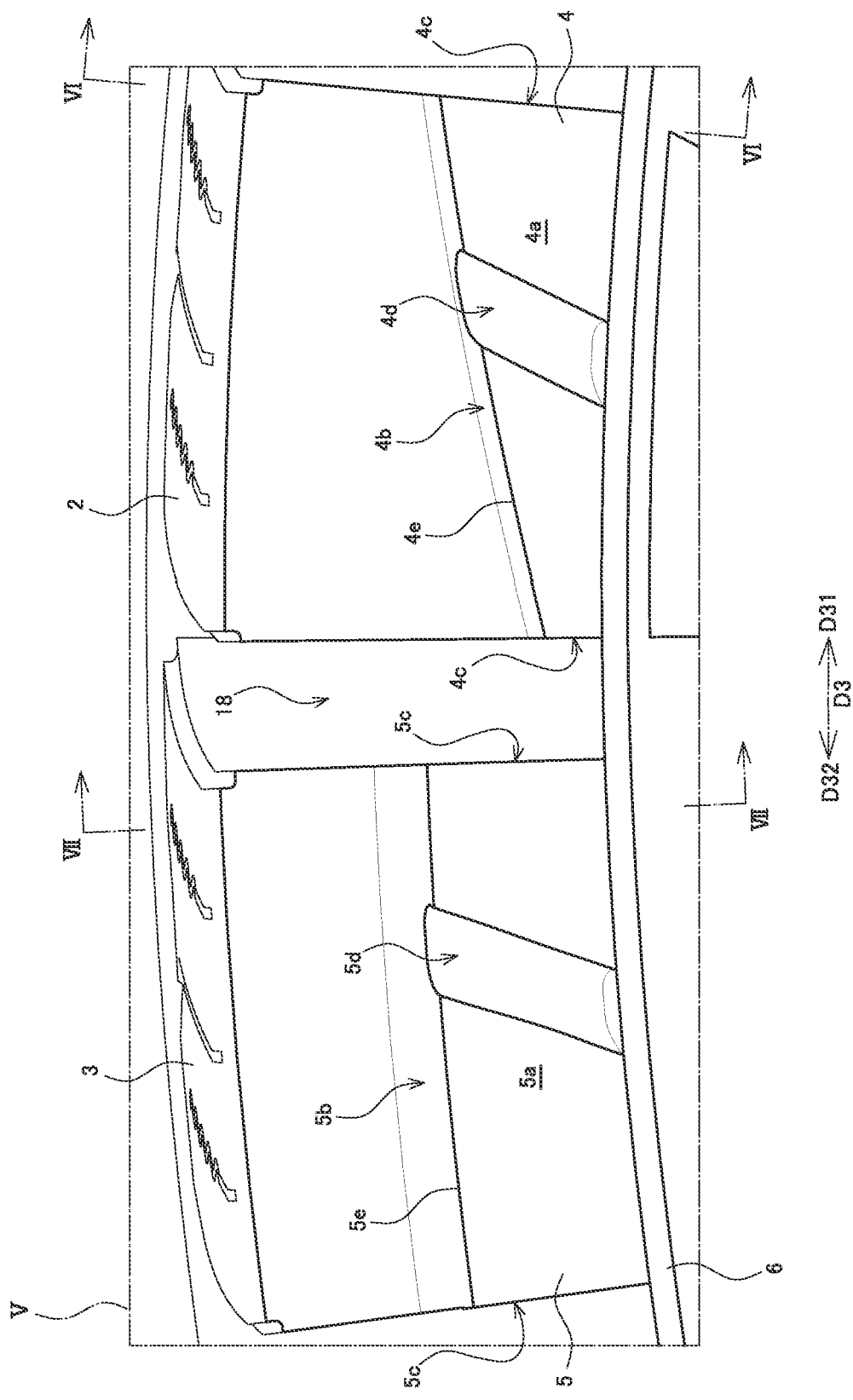
FIG. 5 is an enlarged view of region V in FIG. 4.

As shown in FIG. 5, first side block 4 comprises first apical surface 4a which is arranged at the outer end thereof in the tire axial direction D1. In addition, first side block 4 may, as is the case in the present embodiment, comprise first radially lateral face 4b which is arranged at the outer end thereof in the tire radial direction D2, and first circumferentially lateral faces 4c which are arranged at the ends thereof in the tire circumferential direction D3. Moreover, the inner end in the tire radial direction D2 of first side block 4 may, as is the case in the present embodiment, be contiguous with annular protrusion 6.

In addition, the peak-like shape formed by first apical surface 4a and first radially lateral face 4b, i.e., the outer end edge 4e in the tire radial direction D2 of first apical surface 4a, extends in such fashion as to intersect the tire circumferential direction D3. For example, outer end edge 4e of first apical surface 4a might, as is the case in the present embodiment, extend in such fashion as to cause it to be increasingly toward the exterior in the tire radial direction D2 as one proceeds toward first circumferential direction side D31.

First apical surface 4a comprises first side groove 4d which extends in the tire radial direction D2. First side groove 4d extends from the outer end to the inner end in the tire radial direction D2 of first apical surface 4a. In addition, first side groove 4d may, as is the case in the present embodiment, extend so as to be inclined with respect to the tire radial direction D2. For example, first side groove 4d might extend in such fashion as to cause it to be increasingly toward first circumferential direction side D31 as one proceeds toward the exterior in the tire radial direction D2.

Moreover, the side to which first side groove 4d is inclined with respect to the tire radial direction D2 may, as is the case in the present embodiment, be the same as the side to which outer end edge 4e of first apical surface 4a is inclined with respect to the tire radial direction D2. More specifically, outer end edge 4e of first apical surface 4a and first side groove 4d might, as is the case in the present embodiment, extend in such fashion as to be increasingly toward first circumferential direction side D31 as one proceeds toward the exterior in the tire radial direction D2.

Second side block 5 comprises second apical surface 5a which is arranged at the outer end thereof in the tire axial direction D1. In addition, second side block 5 may, as is the case in the present embodiment, comprise second radially lateral face 5b which is arranged at the outer end thereof in the tire radial direction D2, and second circumferentially lateral faces 5c which are arranged at the ends thereof in the tire circumferential direction D3. Moreover, the inner end in the tire radial direction D2 of second side block 5 may, as is the case in the present embodiment, be contiguous with annular protrusion 6.

In addition, the peak-like shape formed by second apical surface 5a and second radially lateral face 5b, i.e., the outer end edge 5e in the tire radial direction D2 of second apical surface 5a, may, as is the case in the present embodiment, extend along the tire circumferential direction D3. Moreover, outer end edge 5e of second apical surface 5a may, like outer end edge 4e of first apical surface 4a, extend so as to intersect the tire circumferential direction D3.

Second apical surface 5a comprises second side groove 5d which extends in the tire radial direction D2. Second side groove 5d extends from the outer end to the inner end in the tire radial direction D2 of second apical surface 5a. In addition, second side groove 5d may, as is the case in the present embodiment, extend so as to be inclined with respect to the tire radial direction D2. For example, second side groove 5d might extend in such fashion as to cause it to be increasingly toward first circumferential direction side D31 as one proceeds toward the exterior in the tire radial direction D2.

Moreover, the side to which second side groove 5d is inclined with respect to the tire radial direction D2 may, as is the case in the present embodiment, be the same as the side to which first side groove 4d is inclined with respect to the tire radial direction D2. For example, first side groove 4d and second side groove 5d might, as is the case in the present embodiment, extend in such fashion as to be increasingly toward first circumferential direction side D31 as one proceeds toward the exterior in the tire radial direction D2.

In addition, the area of second apical surface 5a is greater than the area of first apical surface 4a. Moreover, where, e.g., as is the case in the present embodiment, concavity or concavities such as side grooves 4d, 5d are present, areas of apical surfaces 4a, 5a should be understood to refer to the areas inclusive of concavity or concavities such as side grooves 4d, 5d. That is, areas of apical surfaces 4a, 5a should be understood to refer to what the areas would be were concavity or concavities such as side grooves 4d, 5d not present.

Figure 6:
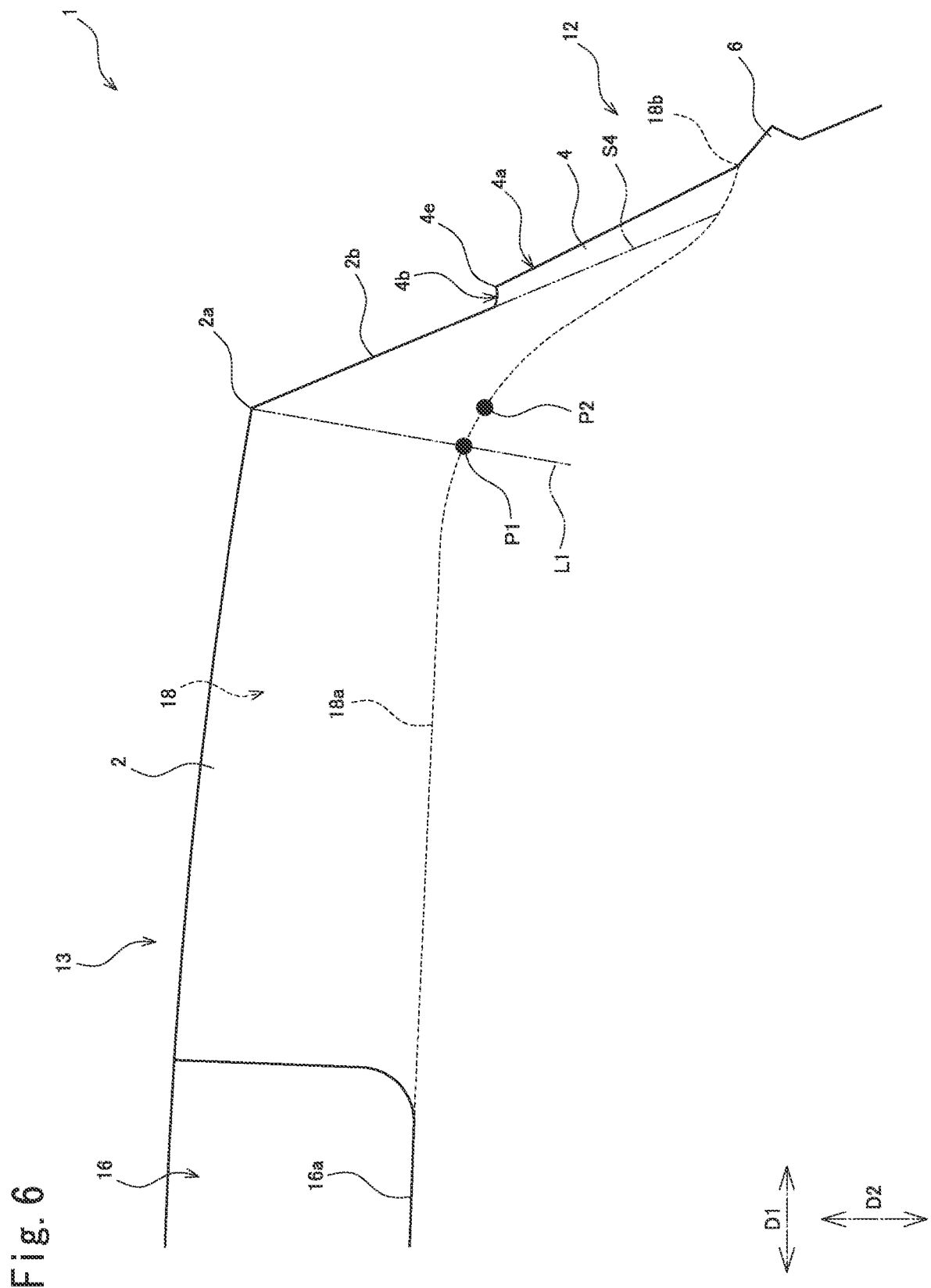
FIG. 6 is an enlarged view of a section taken along VI-VI in FIG. 5 (view of a section taken along a tire meridional plane)
Figure 7:
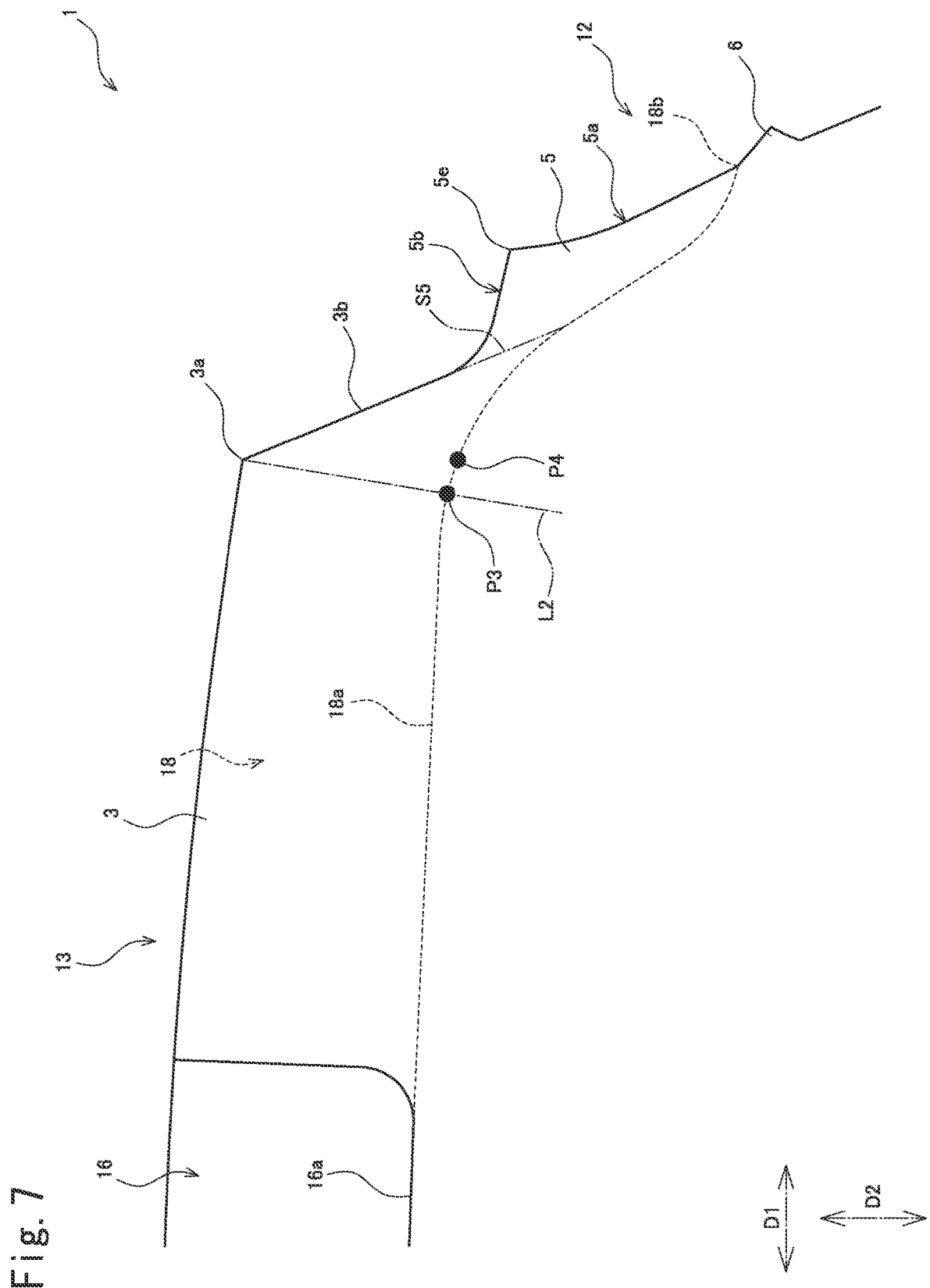
FIG. 7 is an enlarged view of a section taken along VII-VII in FIG. 5 (view of a section taken along a tire meridional plane)

As shown in FIG. 5 through FIG. 7, width groove 18 may, as is the case in the present embodiment, extend as far as a location between first side block 4 and second side block 5. In addition, width groove 18 may, as is the case in the present embodiment, extend as far as the exterior surface in the tire axial direction D1 of sidewall 12. Such a constitution will have the effect of causing width groove 18 to be arranged such that it extends across a region corresponding to tread 13 and sidewalls 12, the outer ends in the tire axial direction D1 of width groove 18 being open at the exterior surfaces in the tire axial direction D1 of sidewalls 12.

As shown in FIG. 6, first side block 4 is arranged toward the exterior in the tire axial direction D1 from first tread block 2. In addition, as viewed in the tire axial direction D1, a portion of first side block 4 may, as is the case in the present embodiment, appear to overlap a portion of first tread block 2. More specifically, as viewed in the tire axial direction D1, a portion toward the exterior in the tire radial direction D2 of first side block 4 may, as is the case in the present embodiment, appear to overlap a portion toward the interior in the tire radial direction D2 of first tread block 2.

As a result of such constitution, first side block 4 is contiguous with the exterior in the tire axial direction D1 of first tread block 2. Note that the inner end in the tire radial direction D2 of first tread block 2 is located at groove bottom 18a of width groove 18.

At FIG. 6, boundary S4 between first tread block 2 and first side block 4 is shown in double-dash chain line. For example, as viewed in a tire meridional section, such boundary S4 might be defined by that portion of outer side face 2b in the tire axial direction D1 of first tread block 2 which is the extension thereof corresponding to the inner end portion in the tire radial direction D2.

Moreover, as viewed in a tire meridional section, outer side face 2b of first tread block 2 is made up of at least one straight line, arc, plurality of arcs of differing radii of curvature, or any combination thereof. In addition, as viewed in a tire meridional section, outer side face 2b of first tread block 2 may, e.g., as is the case in the present embodiment, be made up of a single straight line.

First apical surface 4a is arranged toward the interior in the tire radial direction D2 from groove bottom 16a of shoulder main groove 16. In addition, outer end edge 4e in the tire radial direction D2 of first apical surface 4a may, as is the case in the present embodiment, be arranged toward the exterior in the tire radial direction D2 from that location at groove bottom 18a of width groove 18 which corresponds to outer end 18b in the tire axial direction D1.

Furthermore, outer end edge 4e in the tire radial direction D2 of first apical surface 4a might, e.g., as is the case in the present embodiment, be arranged toward the interior in the tire radial direction D2 from first reference location P1 at groove bottom 18a of width groove 18. Moreover, as viewed in a tire meridional section, first reference location P1 is a location at which the groove bottom 18a of width groove 18 is intersected by a line L1 normal to outer end 2a in the tire axial direction D1 at the tread surface 13a of first tread block 2.

Furthermore, outer end edge 4e in the tire radial direction D2 of first apical surface 4a might, e.g., as is the case in the present embodiment, be arranged toward the interior in the tire radial direction D2 from second reference location P2 at groove bottom 18a of width groove 18. Moreover, second reference location P2 is at a location in the tire axial direction D1 which is the same as that of outer end 2a of first tread block 2.

Furthermore, the inner end in the tire radial direction D2 of first apical surface 4a might, e.g., as is the case in the present embodiment, be at the same location in the tire radial direction D2 as outer end 18b of groove bottom 18a of width groove 18. Moreover, the inner end in the tire radial direction D2 of first apical surface 4a might, e.g., as is the case in the present embodiment, be arranged toward the exterior in the tire radial direction D2 from outer end 18b of groove bottom 18a of width groove 18.

As shown in FIG. 7, second side block 5 is arranged toward the exterior in the tire axial direction D1 from second tread block 3. In addition, as viewed in the tire axial direction D1, a portion of second side block 5 may, as is the case in the present embodiment, appear to overlap a portion of second tread block 3. More specifically, as viewed in the tire axial direction D1, a portion toward the exterior in the tire radial direction D2 of second side block 5 may, as is the case in the present embodiment, appear to overlap a portion toward the interior in the tire radial direction D2 of second tread block 3.

As a result of such constitution, second side block 5 is contiguous with the exterior in the tire axial direction D1 of second tread block 3. Note that the inner end in the tire radial direction D2 of second tread block 3 is located at groove bottom 18a of width groove 18.

At FIG. 7, boundary S5 between second tread block 3 and second side block 5 is shown in double-dash chain line. For example, as viewed in a tire meridional section, such boundary S5 might be defined by that portion of outer side face 3b in the tire axial direction D1 of second tread block 3 which is the extension thereof corresponding to the inner end portion in the tire radial direction D2.

Moreover, as viewed in a tire meridional section, outer side face 3*b* of second tread block 3 is made up of at least one straight line, arc, plurality of arcs of differing radii of curvature, or any combination thereof. In addition, as viewed in a tire meridional section, outer side face 3*b* of second tread block 3 may, e.g., as is the case in the present embodiment, be made up of a single straight line.

Second apical surface 5*a* is arranged toward the interior in the tire radial direction D2 from groove bottom 16*a* of shoulder main groove 16. In addition, outer end edge 5*e* in the tire radial direction D2 of second apical surface 5*a* may, as is the case in the present embodiment, be arranged toward the exterior in the tire radial direction D2 from that location at groove bottom 18*a* of width groove 18 which corresponds to outer end 18*b* in the tire axial direction D1.

Furthermore, outer end edge 5*e* in the tire radial direction D2 of second apical surface 5*a* might, e.g., as is the case in the present embodiment, be arranged toward the interior in the tire radial direction D2 from third reference location P3 at groove bottom 18*a* of width groove 18. Moreover, as viewed in a tire meridional section, third reference location P3 is a location at which the groove bottom 18*a* of width groove 18 is intersected by a line L2 normal to outer end 3*a* in the tire axial direction D1 at the tread surface 13*a* of second tread block 3.

Furthermore, outer end edge 5*e* in the tire radial direction D2 of second apical surface 5*a* might, e.g., as is the case in the present embodiment, be arranged toward the interior in the tire radial direction D2 from fourth reference location P4 at groove bottom 18*a* of width groove 18. Moreover, fourth reference location P4 is at a location in the tire axial direction D1 which is the same as that of outer end 3*a* of second tread block 3.

Furthermore, the inner end in the tire radial direction D2 of second apical surface 5*a* might, e.g., as is the case in the present embodiment, be at the same location in the tire radial direction D2 as outer end 18*b* of groove bottom 18*a* of width groove 18. Moreover, the inner end in the tire radial direction D2 of second apical surface 5*a* might, e.g., as is the case in the present embodiment, be arranged toward the exterior in the tire radial direction D2 from outer end 18*b* of groove bottom 18*a* of width groove 18.

In addition, as shown in FIG. 6 and FIG. 7, the volume of second side block 5 may, as is the case in the present embodiment, be greater than the volume of first side block 4. Furthermore, as viewed in a tire meridional section, the area of second side block 5 may, as is the case in the present embodiment, be greater than the area of first side block 4.

Moreover, as viewed in a tire meridional section, the maximum area of second side block 5 may, e.g., as is the case in the present embodiment, be greater than the maximum area of first side block 4. Furthermore, as viewed in a tire meridional section, the average area of second side block 5 may, e.g., as is the case in the present embodiment, be greater than the average area of first side block 4.

Figure 8:
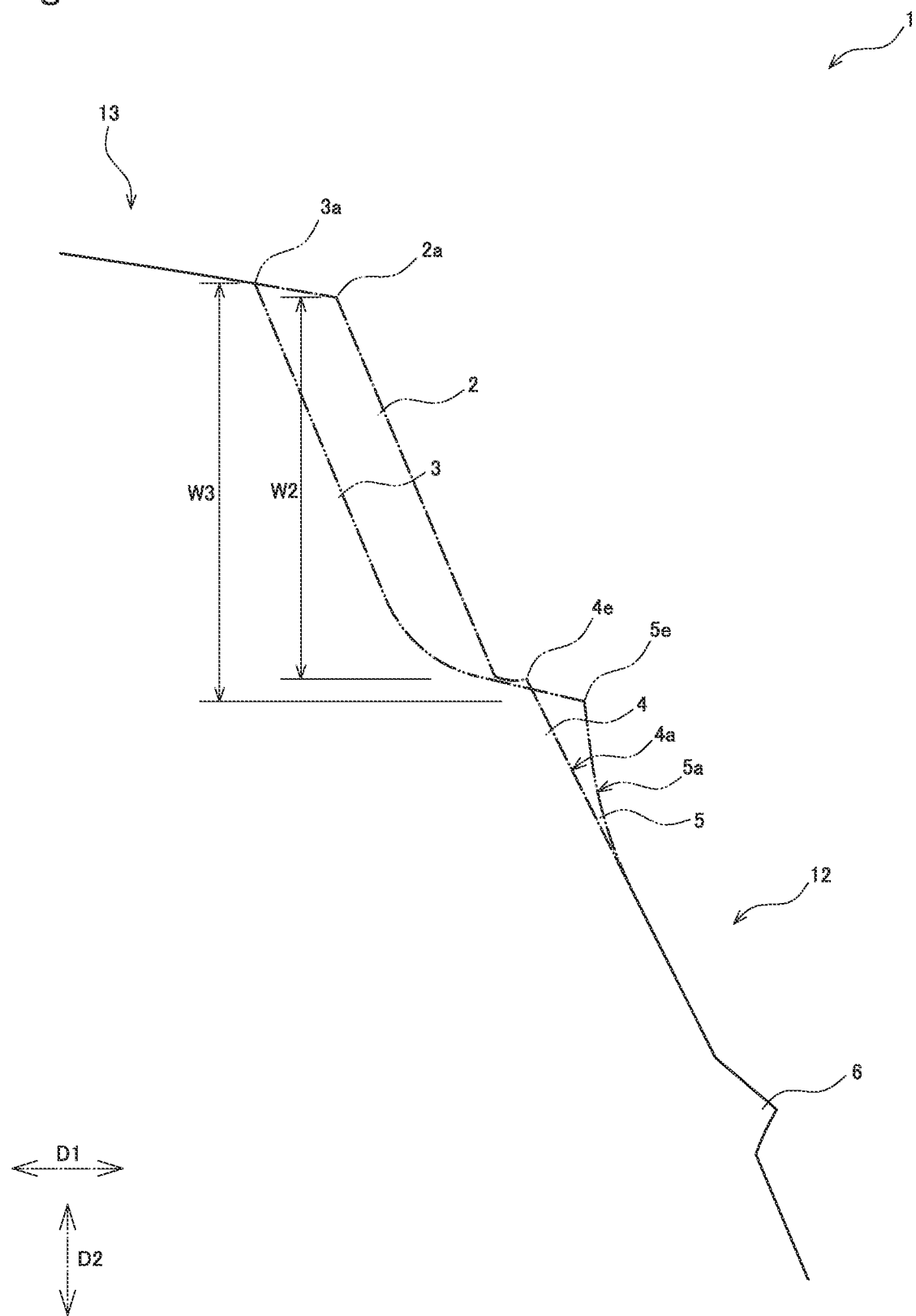
FIG. 8 is an enlarged view in which principal components in sectional view of FIG. 6 and principal components in sectional view of FIG. 7 are shown in mutually overlapping fashion.

It so happens that FIG. 8 is a drawing at which a portion of the tire meridional section at FIG. 6 and a portion of the tire meridional section at FIG. 7 are shown in mutually overlapping fashion, which is to say that it shows the situation as it would appear when viewed in the tire circumferential direction D3. At FIG. 8, the outer edges of first tread block 2 and first side block 4 (see FIG. 6) are shown in single-dash chain line; the outer edges of second tread block 3 and second side block 5 (see FIG. 7) are shown in double-dash chain line; and the outer edges at locations where the outer edges of first and second tread blocks 2, 3 coincide, and the outer edges at locations where the outer edges of first and second side blocks 4, 5 coincide, are shown in solid line.

In addition, as shown in FIG. 8, outer end edge 5*e* in the tire radial direction D2 of second apical surface 5*a* is arranged toward the exterior in the tire axial direction D1 from outer end edge 4*e* in the tire radial direction D2 of first apical surface 4*a*. Moreover, a portion (the portion shown in solid line in FIG. 8) toward the interior in the tire radial direction D2 of second apical surface 5*a* may, as is the case in the present embodiment, be at the same location in the tire axial direction D1 as a portion (the portion shown in solid line in FIG. 8) toward the interior in the tire radial direction D2 of first apical surface 4*a*.

Furthermore, as shown in FIG. 5 and FIG. 8, the outermost location in the tire radial direction D2 of outer end edge 4*e* of first apical surface 4*a* may, as is the case in the present embodiment, be arranged toward the exterior in the tire radial direction D2 from the outermost location in the tire radial direction D2 of outer end edge 5*e* of second apical surface 5*a*. Moreover, while there is no particular limitation with respect thereto, in accordance with the present embodiment, such outermost location of outer end edge 4*e* of first apical surface 4*a* is the location of the end portion on the first circumferential direction side D31, and outer end edge 5*e* of second apical surface 5*a* is at the same location in the tire radial direction D2 along the entire length thereof.

Furthermore, the innermost location in the tire radial direction D2 of outer end edge 4*e* of first apical surface 4*a* may, as is the case in the present embodiment, be arranged toward the interior in the tire radial direction D2 from the innermost location in the tire radial direction D2 of outer end edge 5*e* of second apical surface 5*a*. Moreover, while there is no particular limitation with respect thereto, in accordance with the present embodiment, such innermost location of outer end edge 4*e* of first apical surface 4*a* is the location of the end portion on the second circumferential direction side D32, and outer end edge 5*e* of second apical surface 5*a* is at the same location in the tire radial direction D2 along the entire length thereof.

Thus, a portion (the portion on the first circumferential direction side D31) of outer end edge 4*e* of first apical surface 4*a* may, as is the case in the present embodiment, be arranged toward the exterior in the tire radial direction D2 from outer end edge 5*e* of second apical surface 5*a*. Furthermore, a portion (the portion on the second circumferential direction side D32) of outer end edge 4*e* of first apical surface 4*a* may, as is the case in the present embodiment, be arranged toward the interior in the tire radial direction D2 from outer end edge 5*e* of second apical surface 5*a*.

Moreover, while there is no particular limitation with respect thereto, distance W2 in the tire radial direction D2 between outer end 2*a* of first tread block 2 and outer end edge 4*e* of first apical surface 4*a*, distance W3 in the tire radial direction D2 between outer end 3*a* of second tread block 3 and outer end edge 5*e* of second apical surface 5*a*, may be 2 mm to 10 mm.

In addition, it is, for example, preferred that such distances W2, W3 be not less than 4 mm, and it is, for example, more preferred that these be not less than 5 mm. Furthermore, it is, for example, preferred that such distances W2, W3 be not greater than 8 mm, and it is, for example, more preferred that these be not greater than 6 mm.

Note that the foregoing respective dimensions, positional relationships, relative magnitudes, and so forth should be understood to be as measured under normal conditions when tire 1 mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO.

Constitution of pneumatic tire 1 associated with the present embodiment is as described above; action of pneumatic tire 1 associated with the present embodiment is described below.

Performance with respect to traction will first be described.

Firstly, outer end 2a of first tread block 2 is arranged toward the exterior in the tire axial direction D1 from outer end 3a of second tread block 3. This being the case, the difference in the locations in the tire axial direction D1 of outer end 2a of first tread block 2 and outer end 3a of second tread block 3 makes it possible to effectively cause traction to be produced at first tread block 2.

What is more, outer end edge 5e of second apical surface 5a is arranged toward the exterior in the tire axial direction D1 from outer end edge 4e of first apical surface 4a. This being the case, the difference in the locations in the tire axial direction D1 of outer end edge 4e of first apical surface 4a and outer end edge 5e of second apical surface 5a makes it possible to effectively cause traction to be produced at second side block 5.

Thus, not only is it possible to cause traction to be effectively produced at first tread block 2 but it is also possible to cause traction to be effectively produced at second side block 5. Accordingly, it will, for example, be possible to suppress occurrence of differences in the magnitude of traction in the tire circumferential direction D3.

In addition, first side groove 4d extends the full length in the tire radial direction D2 of first apical surface 4a, and second side groove 5d extends along the full length in the tire radial direction D2 of second apical surface 5a. As a result, this makes it possible for traction to be produced not only by the outside circumferential edges of first and second side blocks 4, 5 but also by side grooves 4d, 5d.

Furthermore, because outer end edge 4e of first apical surface 4a extends in such fashion as to intersect the tire circumferential direction D3, not only does outer end edge 4e of first apical surface 4a have component in the tire circumferential direction D3 but it also has component in the tire radial direction D2. This makes it possible for traction to be effectively produced by outer end edge 4e of first apical surface 4a.

Furthermore, whereas outer end edge 5e of second apical surface 5a extends in parallel fashion with respect to the tire circumferential direction D3, a portion (the portion on the first circumferential direction side D31) of outer end edge 4e of first apical surface 4a is arranged toward the exterior in the tire radial direction D2 from outer end edge 5e of second apical surface 5a. As a result, the difference in the locations in the tire radial direction D2 of outer end edge 4e of first apical surface 4a and outer end edge 5e of second apical surface 5a makes it possible to effectively cause traction to be produced at outer end edges 4e, 5e of respective apical surfaces 4a, 5a.

Furthermore, whereas outer end edge 5e of second apical surface 5a extends in parallel fashion with respect to the tire circumferential direction D3, a portion (the portion on the second circumferential direction side D32) of outer end edge 4e of first apical surface 4a is arranged toward the interior in the tire radial direction D2 from outer end edge 5e of second apical surface 5a. As a result, the difference in the locations in the tire radial direction D2 of outer end edge 4e of first apical surface 4a and outer end edge 5e of second apical surface 5a makes it possible to effectively cause traction to be produced at outer end edges 4e, 5e of respective apical surfaces 4a, 5a.

It so happens that first apical surface 4a and second apical surface 5a are arranged toward the interior in the tire radial direction D2 from groove bottom 16a of shoulder main groove 16. What is more, outer end edges 4e, 5e of respective apical surfaces 4a, 5a are arranged toward the interior in the tire radial direction D2 from respective reference locations P1 through P4 at groove bottom 18a of width groove 18.

As a result, outer end edges 4e, 5e of respective apical surfaces 4a, 5a will continue to be arranged toward the interior in the tire radial direction D2 from outer ends 2a, 3a of tread blocks 2, 3 following occurrence of wear thereat. Accordingly, even where there is occurrence of wear at tread blocks 2, 3, because steps will continue to be formed between outer end edges 4e, 5e of respective apical surfaces 4a, 5a and outer ends 2a, 3a of tread blocks 2, 3, such steps will make it possible for traction to be effectively produced thereat.

Description will next be given with respect to differences in rigidity in the tire circumferential direction D3 of the buttress.

Firstly, outer end 3a of second tread block 3 is arranged toward the interior in the tire axial direction D1 from outer end 2a of first tread block 2. As a result, the rigidity of the outer end portion in the tire axial direction D1 of second tread block 3 will tend to be less than the rigidity of the outer end portion in the tire axial direction D1 of first tread block 2.

To address this, the area of second apical surface 5a is greater than the area of first apical surface 4a. What is more, the volume of second side block 5 is greater than the volume of first side block 4. This causes the rigidity of second side block 5 to be greater than the rigidity of first side block 4. Accordingly, it will be possible to suppress occurrence of differences in the rigidity of the buttress in the tire circumferential direction D3.

Furthermore, first apical surface 4a and second apical surface 5a are arranged toward the interior in the tire radial direction D2 from groove bottom 16a of shoulder main groove 16. What is more, outer end edges 4e, 5e of respective apical surfaces 4a, 5a are arranged toward the interior in the tire radial direction D2 from respective reference locations P1 through P4 at groove bottom 18a of width groove 18.

As a result, outer end edges 4e, 5e of respective apical surfaces 4a, 5a will continue to be arranged toward the interior in the tire radial direction D2 from outer ends 2a, 3a of tread blocks 2, 3 following occurrence of wear thereat. Accordingly, even where there is occurrence of wear at tread blocks 2, 3, it will be possible to suppress occurrence of situations in which first and second side blocks 4, 5 might otherwise exert excessive influence on the rigidity of the buttress. As a result, it will be possible to effectively suppress occurrence of differences in the rigidity of the buttress in the tire circumferential direction D3.

Thus, because a pneumatic tire 1 associated with the present embodiment makes it possible for traction to be produced effectively, it permits achievement of improvement in terms of performance with respect to traction. What is more, because it makes it possible to suppress occurrence of differences in the rigidity of the buttress in the tire circumferential direction D3, it will, for example, make it possible to suppress occurrence of uneven wear at the outer end portions in the tire axial direction D1 of first and second tread blocks 2, 3.

As described above, as in the present embodiment, it is preferred that the pneumatic tire 1 includes:

a sidewall 12 which extends in a tire radial direction D2; and a tread 13 which is contiguous with an outer end in the tire radial direction D12 of the sidewall 12 and which has a tread surface 13a toward the exterior in the tire radial direction D2;

wherein the tread 13 comprises a plurality of width grooves 18 which extend as far as an outer end in a tire axial direction D1, and a plurality of tread blocks 2, 3 which are partitioned by the plurality of width grooves 18;

the plurality of tread blocks 2, 3 include a first tread block 2, and a second tread block 3, an outer end 3a in the tire axial direction D1 at the tread surface 13a of the second tread block 3 is arranged toward the interior in the tire axial direction D1 from an outer end 2a in the tire axial direction D1 at the tread surface 13a of the first tread block 2;

the sidewall 12 comprises a plurality of side blocks 4, 5, 7, 8 which protrude therefrom in the tire axial direction D1;

the plurality of side blocks 4, 5, 7, 8 include a first side block 4 which is contiguous with the exterior in the tire axial direction D1 of the first tread block 2, and a second side block 5 which is contiguous with the exterior in the tire axial direction D1 of the second tread block 3;

the first side block 4 comprises a first apical surface 4a which is arranged at an outer end of the first side block 4 in the tire axial direction D1;

the second side block 5 comprises a second apical surface 5a which is arranged at an outer end of the second side block 5 in the tire axial direction D1; and area of the second apical surface 5a is greater than area of the first apical surface 4a.

In accordance with such constitution, outer end 3a in the tire axial direction D1 at tread surface 13a of second tread block 3 is arranged toward the interior in the tire axial direction D1 from outer end 2a in the tire axial direction D1 at tread surface 13a of first tread block 2. As a result, because the difference in the locations in the tire axial direction D1 of outer end 2a of first tread block 2 and outer end 3a of second tread block 3 makes it possible for traction to be effectively produced, this makes it possible to achieve improvement in terms of performance with respect to traction.

On the other hand, to address the fact that rigidity at the outer end portion in the tire axial direction D1 of second tread block 3 tends to be less than rigidity at the outer end portion in the tire axial direction D1 of first tread block 2, the area of second apical surface 5a of second side block 5 is made greater than the area of first apical surface 4a of first side block 4. As a result, because the rigidity of second side block 5 is greater than the rigidity of first side block 4, it is possible to suppress occurrence of differences in the rigidity of the buttress in the tire circumferential direction D3.

Further, as in the present embodiment, it is preferred that the pneumatic tire 1 includes a configuration in which:

the tread 13 comprises a plurality of main grooves 16, 17 that extend in a tire circumferential direction D3;

the plurality of main grooves 16, 17 include a shoulder main groove 16 which is arranged in outermost fashion in the tire axial direction D1; and the first apical surface 4a and the second apical surface 5a are arranged toward the interior in the tire radial direction D2 from a groove bottom 16a of the shoulder main groove 16.

In accordance with such constitution, because first apical surface 4a and second apical surface 5a are arranged toward the interior in the tire radial direction D2 from groove bottom 16a of shoulder main groove 16, first apical surface 4a and second apical surface 5a will continue to be arranged toward the interior in the tire radial direction D2 from outer ends 2a, 3a in the tire axial direction D1 of tread blocks 2, 3 following occurrence of wear thereat.

Further, as in the present embodiment, it is preferred that the pneumatic tire 1 includes a configuration in which:

the first apical surface 4a comprises a first outer end edge 4e which is arranged at an outer end of the first apical surface 4a in the tire radial direction D2;

the second apical surface 5a comprises a second outer end edge 5e which is arranged at an outer end of the second apical surface 5a in the tire radial direction D2; and at least one (the first outer end edge 4e in this embodiment) of the first outer end edge 4e and the second outer end edge 5e extends in such fashion as to intersect the tire circumferential direction D3.

In accordance with such constitution, because outer end edge 4e in the tire radial direction D2 of at least one of first apical surface 4a and second apical surface 5a extends in such fashion as to intersect the tire circumferential direction D3, not only does such outer end edge 4e have component in the tire circumferential direction D3 but it also has component in the tire radial direction D2. This makes it possible for traction to be effectively produced by such outer end edge 4e.

Further, as in the present embodiment, it is preferred that the pneumatic tire 1 includes a configuration in which:

the first apical surface 4a comprises a first outer end edge 4e which is arranged at an outer end of the first apical surface 4a in the tire radial direction D2;

the second apical surface 5a comprises a second outer end edge 5e which is arranged at an outer end of the second apical surface 5a in the tire radial direction D2; and the second outer end edge 5e is arranged toward the exterior in the tire axial direction D1 from the first outer end edge 4e.

In accordance with such constitution, because outer end edge 5e in the tire radial direction D2 of second apical surface 5a is arranged toward the exterior in the tire axial direction D1 from outer end edge 4e in the tire radial direction D2 of first apical surface 4a, the difference in the locations in the tire axial direction D1 of outer end edge 5e of second apical surface 5a and outer end edge 4e of first apical surface 4a makes it possible for traction to be effectively produced.

Further, as in the present embodiment, it is preferred that the pneumatic tire 1 includes a configuration in which:

the first apical surface 4a comprises a first side groove 4d which extends in the tire radial direction D2; and the second apical surface 5a comprises a second side groove 5d which extends in the tire radial direction D2.

In accordance with such constitution, because side grooves 4d, 5d extend in the tire radial direction D2, this makes it possible for traction to be produced not only by the outside circumferential edges of apical surfaces 4a, 5a but also by side grooves 4d, 5d. As a result, this makes it possible for traction to be effectively produced by first and second side blocks 4, 5.

Further, as in the present embodiment, it is preferred that the pneumatic tire 1 includes a configuration in which:

the first side groove 4d extends from an outer end to an inner end in the tire radial direction D2 of the first apical surface 4a, and the second side groove 5d extends from an outer end to an inner end in the tire radial direction D2 of the second apical surface 5a.

In accordance with such constitution, because side grooves 4d, 5d extend from outer ends to inner ends in the tire radial direction D2 of apical surfaces 4a, 5a, side grooves 4d, 5d will be arranged along the full lengths in the tire radial direction D2 of apical surfaces 4a, 5a. This will make it possible for traction to be more effectively produced by side grooves 4d, 5d.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that first apical surface 4a and second apical surface 5a are arranged toward the interior in the tire radial direction D2 from groove bottom 16a of shoulder main groove 16. However, pneumatic tire 1 is not limited to such constitution.

For example, the constitution may be such that portions (at least outer end edges 4e, 5e in the tire radial direction D2) of respective apical surfaces 4a, 5a are arranged toward the exterior in the tire radial direction D2 from groove bottom 16a of shoulder main groove 16. Furthermore, for example, it is also possible to adopt a constitution in which outer end edges 4e, 5e in the tire radial direction D2 of respective apical surfaces 4a, 5a are at the same location in the tire radial direction D2 as groove bottom 16a of shoulder main groove 16.

(2) Furthermore, the constitution of pneumatic tire 1 associated with the foregoing embodiment is such that outer end edge 4e in the tire radial direction D2 of first apical surface 4a extends in such fashion as to intersect the tire circumferential direction D3. However, pneumatic tire 1 is not limited to such constitution. For example, it is also possible to adopt a constitution in which outer end edge 4e in the tire radial direction D2 of first apical surface 4a extends in parallel fashion with respect to the tire circumferential direction D3.

(3) Furthermore, the constitution of pneumatic tire 1 associated with the foregoing embodiment is such that outer end edge 5e in the tire radial direction D2 of second apical surface 5a is arranged toward the exterior in the tire axial direction D1 from outer end edge 4e in the tire radial direction D2 of first apical surface 4a. However, pneumatic tire 1 is not limited to such constitution. It is also possible to adopt a constitution in which, for example, outer end edge 5e of second apical surface 5a is arranged toward the interior in the tire axial direction D1 from outer end edge 4e of first apical surface 4a, and it is also possible to adopt a constitution in which, for example, it is at the same location in the tire axial direction D1 as outer end edge 4e of first apical surface 4a.

(4) Furthermore, the constitution of pneumatic tire 1 associated with the foregoing embodiment is such that respective apical surfaces 4a, 5a comprise side grooves 4d, 5d which extend in the tire radial direction D2 from the outer ends to the inner ends in the tire radial direction D2 of apical surfaces 4a, 5a. However, pneumatic tire 1 is not limited to such constitution.

For example, it is also possible to adopt a constitution in which at least one of first apical surface 4a and second apical surface 5a does not comprise side grooves 4d, 5d. Furthermore, it is also possible, for example, to adopt a constitution in which side grooves 4d, 5d are arranged at portions in the tire radial direction D2 of apical surfaces 4a, 5a. That is, it is also possible to adopt a constitution in which side grooves 4d, 5d are separated from at least one of the outer end and the inner end in the tire radial direction D2 of apical surfaces 4a, 5a.

(5) Furthermore, at pneumatic tire 1, the constitution may be such that first and second side blocks 4, 5 are provided at only one of the sidewalls 12, or the constitution may be such that these are provided at both sidewalls 12. While there is no particular limitation with respect thereto, it is also possible, for example, to adopt a constitution in which first and second side blocks 4, 5 are at least provided at the sidewall 12 which of the two sidewalls 12 is the sidewall 12 that is arranged so as to be toward the exterior when mounted on a vehicle.

The invention claimed is:

1. A pneumatic tire comprising:
   a sidewall which extends in a tire radial direction; and
   a tread which is contiguous with an outer end in the tire radial direction of the sidewall and which has a tread surface toward the exterior in the tire radial direction, wherein
   the tread comprises a plurality of width grooves which extend as far as an outer end in a tire axial direction, and a plurality of tread blocks which are partitioned by the plurality of width grooves,
   the plurality of tread blocks include a first tread block, and a second tread block, an outer end in the tire axial direction at the tread surface of the second tread block is arranged toward the interior in the tire axial direction from an outer end in the tire axial direction at the tread surface of the first tread block,
   the sidewall comprises a plurality of side blocks which protrude therefrom in the tire axial direction,
   the plurality of side blocks include a first side block which is contiguous with the exterior in the tire axial direction of the first tread block, and a second side block which is contiguous with the exterior in the tire axial direction of the second tread block,
   the first side block comprises a first apical surface which is arranged at an outer end of the first side block in the tire axial direction,
   the second side block comprises a second apical surface which is arranged at an outer end of the second side block in the tire axial direction,
   an area of the second apical surface is greater than area of the first apical surface,
   the first apical surface comprises a first outer end edge which is arranged at an outer end of the first apical surface in the tire radial direction, the second apical surface comprises a second outer end edge which is arranged at an outer end of the second apical surface in the tire radial direction, and at least one of the first outer end edge and the second outer end edge extends in such fashion as to intersect the tire circumferential direction.

2. The pneumatic tire according to claim 1 wherein volume of the second side block is greater than volume of the first side block.

3. The pneumatic tire according to claim 1, wherein
the sidewall comprises an annular protrusion which protrudes in the tire axial direction and which extends in the tire circumferential direction, and
the first side block and the second side block are arranged toward the exterior in the tire radial direction from the annular protrusion.

4. The pneumatic tire according to claim 3 wherein
a groove bottom of at least one of the width grooves includes a first reference location,
as viewed in a tire meridional section, the first reference location is a location at which the groove bottom of the at least one width groove is intersected by a line normal to the outer end in the tire axial direction at the tread surface of the first tread block, and
the first apical surface is arranged toward the interior in the tire radial direction from the first reference location.

5. The pneumatic tire according to claim 3 wherein
the groove bottom of the at least one width groove includes a second reference location,
as viewed in a tire meridional section, the second reference location is a same location in the tire axial direction as the outer end in the tire axial direction at the tread surface of the first tread block, and
the first apical surface is arranged toward the interior in the tire radial direction from the second reference location.

6. The pneumatic tire according to claim 1, wherein
the first outer end edge extends in such fashion as to intersect the tire circumferential direction; and
the second outer end edge extends in such fashion as to be parallel to the tire circumferential direction.

7. The pneumatic tire according to claim 6 wherein an innermost location in the tire radial direction of the first outer end edge is arranged toward the interior in the tire radial direction from an innermost location in the tire radial direction of the second outer end edge.

8. The pneumatic tire according to claim 6 wherein an outermost location in the tire radial direction of the first outer end edge is arranged toward the exterior in the tire radial direction from an outermost location in the tire radial direction of the second outer end edge.

9. The pneumatic tire according to claim 6 wherein
an innermost location in the tire radial direction of the first outer end edge is arranged toward the interior in the tire radial direction from an innermost location in the tire radial direction of the second outer end edge, and
an outermost location in the tire radial direction of the first outer end edge is arranged toward the exterior in the tire radial direction from an outermost location in the tire radial direction of the second outer end edge.

10. The pneumatic tire according to claim 1, wherein the second outer end edge is arranged toward the exterior in the tire axial direction from the first outer end edge.

11. The pneumatic tire according to claim 1 wherein the first apical surface comprises a first side groove which extends in the tire radial direction.

12. The pneumatic tire according to claim 11 wherein the first side groove extends from an outer end to an inner end in the tire radial direction of the first apical surface.

13. The pneumatic tire according to claim 1 wherein the second apical surface comprises a second side groove which extends in the tire radial direction.

14. The pneumatic tire according to claim 13 wherein the second side groove extends from an outer end to an inner end in the tire radial direction of the second apical surface.

15. The pneumatic tire according to claim 1 wherein
the first apical surface comprises a first side groove which extends in the tire radial direction, and
the second apical surface comprises a second side groove which extends in the tire radial direction.

16. The pneumatic tire according to claim 15 wherein
the first side groove extends from an outer end to an inner end in the tire radial direction of the first apical surface, and
the second side groove extends from an outer end to an inner end in the tire radial direction of the second apical surface.

17. The pneumatic tire according to claim 1 wherein
the first outer end edge extends in such fashion as to be increasingly toward a first side in a tire circumferential direction and toward the exterior in the tire radial direction,
the first apical surface comprises a first side groove which extends in the tire radial direction, and
the first side groove extends in such fashion as to be increasingly toward the first side in the tire circumferential direction and toward the exterior in the tire radial direction.

18. A pneumatic tire comprising:
a sidewall which extends in a tire radial direction; and
a tread which is contiguous with an outer end in the tire radial direction of the sidewall and which has a tread surface toward the exterior in the tire radial direction, wherein
the tread comprises a plurality of width grooves which extend as far as an outer end in a tire axial direction, and a plurality of tread blocks which are partitioned by the plurality of width grooves,
the plurality of tread blocks include a first tread block, and a second tread block, an outer end in the tire axial direction at the tread surface of the second tread block is arranged toward the interior in the tire axial direction from an outer end in the tire axial direction at the tread surface of the first tread block,
the sidewall comprises a plurality of side blocks which protrude therefrom in the tire axial direction,
the plurality of side blocks include a first side block which is contiguous with the exterior in the tire axial direction of the first tread block, and a second side block which is contiguous with the exterior in the tire axial direction of the second tread block,
the first side block comprises a first apical surface which is arranged at an outer end of the first side block in the tire axial direction,
the second side block comprises a second apical surface which is arranged at an outer end of the second side block in the tire axial direction,
an area of the second apical surface is greater than area of the first apical surface,
the first apical surface comprises a first side groove which extends in the tire radial direction,
the second apical surface comprises a second side groove which extends in the tire radial direction, the first side groove extends in such fashion as to be increasingly toward a first side in a tire circumferential direction as one proceeds toward the exterior in the tire radial direction, and the second side groove extends in such fashion as to be increasingly toward the first side in the tire circumferential direction as one proceeds toward the exterior in the tire radial direction.

\* \* \* \* \*